US012795544B2

(12) United States Patent
Venkateswaran et al.

(10) Patent No.: US 12,795,544 B2
(45) Date of Patent: Nov. 10, 2026

(54) COLLISION DETECTION THROUGH INTELLIGENT SILENCE

(71) Applicant: TEXAS INSTRUMENTS INCORPORATED, Dallas, TX (US)

(72) Inventors: Shyam Krishnan Venkateswaran, Atlanta, GA (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 316 days.

(21) Appl. No.: 18/495,611

(22) Filed: Oct. 26, 2023

(65) Prior Publication Data

US 2025/0142476 A1 May 1, 2025

(51) Int. Cl.
*H04W 52/02* (2009.01)
*H04W 72/566* (2023.01)

(52) U.S. Cl.
CPC ..... *H04W 52/0235* (2013.01); *H04W 72/569* (2023.01)

(58) Field of Classification Search
CPC .............. B60L 58/10; H04W 52/0235; H04W 52/0216; H04W 52/0225; H04W 72/569; H04W 52/028; H04W 52/0229; H02J 13/00002; H02J 7/00032; H02J 13/00022; H02J 2310/48; H02J 2105/37; H02J 13/12; H02J 13/1331; H02J 7/40; Y02D 30/70
See application file for complete search history.

(56) References Cited

U.S. PATENT DOCUMENTS

| | | | | |
|---|---|---|---|---|
| 8,755,787 B2 * | 6/2014 | Twitchell, Jr. | ........ | H04W 36/18 370/328 |
| 11,051,248 B2 * | 6/2021 | Doherty | ............ | H04W 52/0229 |
| 11,889,422 B2 * | 1/2024 | Höglund | ........... | H04W 52/0229 |
| 12,015,981 B2 * | 6/2024 | Turtinen | ............... | H04W 72/23 |
| 2014/0092797 A1 * | 4/2014 | Chu | .................. | H04W 52/0216 370/311 |
| 2014/0204822 A1 * | 7/2014 | Park | .................. | H04W 52/0216 370/311 |
| 2015/0351125 A1 * | 12/2015 | Kwon | ................. | H04W 74/002 370/336 |
| 2017/0127439 A1 * | 5/2017 | Gopal | ............... | H04W 72/1263 |

(Continued)

FOREIGN PATENT DOCUMENTS

WO 2022170249 A1 8/2022

OTHER PUBLICATIONS

International Search Report for Corresponding Application No. PCT/US2024/052810, mailed Feb. 17, 2025.

(Continued)

*Primary Examiner* — Kwang B Yao
(74) *Attorney, Agent, or Firm* — Carl G. Peterson; Charles F. Koch

(57) ABSTRACT

In an example, a method includes transmitting a plurality of wake-up frames on a transmission channel from a first node having a first priority. The method also includes pausing the wake-up frames from the first node and listening to the transmission channel after a predetermined number of wake-up frames are transmitted from the first node. The method also includes receiving, at the first node, a wake-up frame from a second node on the transmission channel, wherein the second node has a second priority.

20 Claims, 8 Drawing Sheets

(56) References Cited

U.S. PATENT DOCUMENTS

| | | | | |
|---|---|---|---|---|
| 2018/0263058 | A1* | 9/2018 | Yang | H04W 74/0825 |
| 2018/0279224 | A1* | 9/2018 | Yang | H04W 52/028 |
| 2019/0164410 | A1* | 5/2019 | Honjo | G08B 19/005 |
| 2019/0188997 | A1* | 6/2019 | Gilson | G08B 29/18 |
| 2019/0274103 | A1 | 9/2019 | Gan | |
| 2020/0036194 | A1 | 1/2020 | Park | |
| 2021/0143648 | A1* | 5/2021 | Yeom | H02J 7/0013 |
| 2022/0332213 | A1 | 10/2022 | Xhafa et al. | |
| 2023/0042164 | A1 | 2/2023 | Xhafa et al. | |
| 2023/0051689 | A1 | 2/2023 | Santhana Krishnan et al. | |
| 2023/0187945 | A1* | 6/2023 | Yang | H01M 10/425 702/63 |
| 2023/0199751 | A1* | 6/2023 | Huang | H04W 52/0229 370/329 |
| 2024/0114456 | A1* | 4/2024 | Mahalingam | H04W 52/0245 |
| 2024/0121711 | A1* | 4/2024 | Abotabl | H04W 52/0235 |
| 2024/0147370 | A1* | 5/2024 | Mahalingam | H04W 52/0219 |
| 2024/0380012 | A1* | 11/2024 | Martinez | H04B 17/345 |
| 2025/0031149 | A1* | 1/2025 | Abotabl | H04W 72/1268 |
| 2025/0240717 | A1* | 7/2025 | Gan | H04W 52/0229 |

OTHER PUBLICATIONS

Venkateswaran et al., "Hierarchical Wireless Battery Management System," U.S. Appl. No. 18/345,636, filed Jun. 30, 2023, 64 p.

Xhafa et al., "Efficient Unicast Super Frame Communications," U.S. Appl. No. 17/828,895, filed May 31, 2022, 66 p.

Kunduru et al., "Multiple Primary Nodes for Wireless Battery Management System Robustness," U.S. Appl. No. 17/823,138, filed Aug. 30, 2022, 32 p.

Venkateswaran et al., "Wireless Battery Management Reverse Wake Up," U.S. Appl. No. 18/454,652, filed Aug. 23, 2023, 33 p.

* cited by examiner

Node$_d$ HAS HIGHER PRIORITY THAN Node$_i$

COLLISION DETECTION THROUGH INTELLIGENT SILENCE

BACKGROUND

Modern vehicles may include multiple battery cells. Information associated with the cells, such as temperature, voltage, and other indicators of cell status and health, may be monitored for vehicular safety and to ensure proper operation. In a conventional wired battery management system, rechargeable batteries are managed by circuitry for the safe and efficient operation of the batteries. Wired communication interfaces can be used to connect a main microcontroller (the main node or master node) to each battery module (the secondary nodes), and each battery module is chained to the rest of the battery modules in a daisy chain. With wired communication interfaces, the main microcontroller cannot monitor and control all the battery modules in parallel without complex wiring. This wiring makes repair or replacement of individual battery cells more difficult, and importantly, adds weight and bulk to the overall system.

A wireless connection between the battery modules and the microcontroller makes management of battery modules more flexible and easier to repair. In a wireless battery management system (WBMS), a microcontroller monitors each battery module and communicates with the battery modules using wireless communication interfaces. The main microcontroller controls all the battery modules using a WBMS protocol. Wireless communication interfaces can suffer from wireless communication channel bandwidth variance, interference, and/or other issues, which would prevent proper monitoring and management in a WBMS.

SUMMARY

In accordance with at least one example of the description, a method includes transmitting a plurality of wake-up frames on a transmission channel from a first node having a first priority. The method also includes pausing the wake-up frames from the first node and listening to the transmission channel after a predetermined number of wake-up frames are transmitted from the first node. The method also includes receiving, at the first node, a wake-up frame from a second node on the transmission channel, wherein the second node has a second priority.

In accordance with at least one example of the description, a system includes a first node in a wireless system, where the first node is configured to transmit a plurality of wake-up frames on a transmission channel from the first node having a first priority. The first node is also configured to pause the wake-up frames from the first node and listen to the transmission channel after a predetermined number of wake-up frames are transmitted from the first node. The first node is configured to receive, at the first node, a wake-up frame from a second node on the transmission channel, wherein the second node has a second priority.

In accordance with at least one example of the description, a system includes a first node in a wireless system, where the first node is configured to transmit a first plurality of wake-up frames on a transmission channel from the first node having a first priority. The first node is also configured to pause the wake-up frames from the first node and listen to the transmission channel after a first predetermined number of wake-up frames are transmitted from the first node. The system also includes a second node in the wireless system, where the second node is configured to transmit a second plurality of wake-up frames on the transmission channel from the second node having a second priority. The second node is also configured to pause the wake-up frames from the second node and listen to the transmission channel after a second predetermined number of wake-up frames are transmitted from the second node. The second node is configured to receive, at the second node, a wake-up frame in the first plurality of wake-up frames from the first node on the transmission channel.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
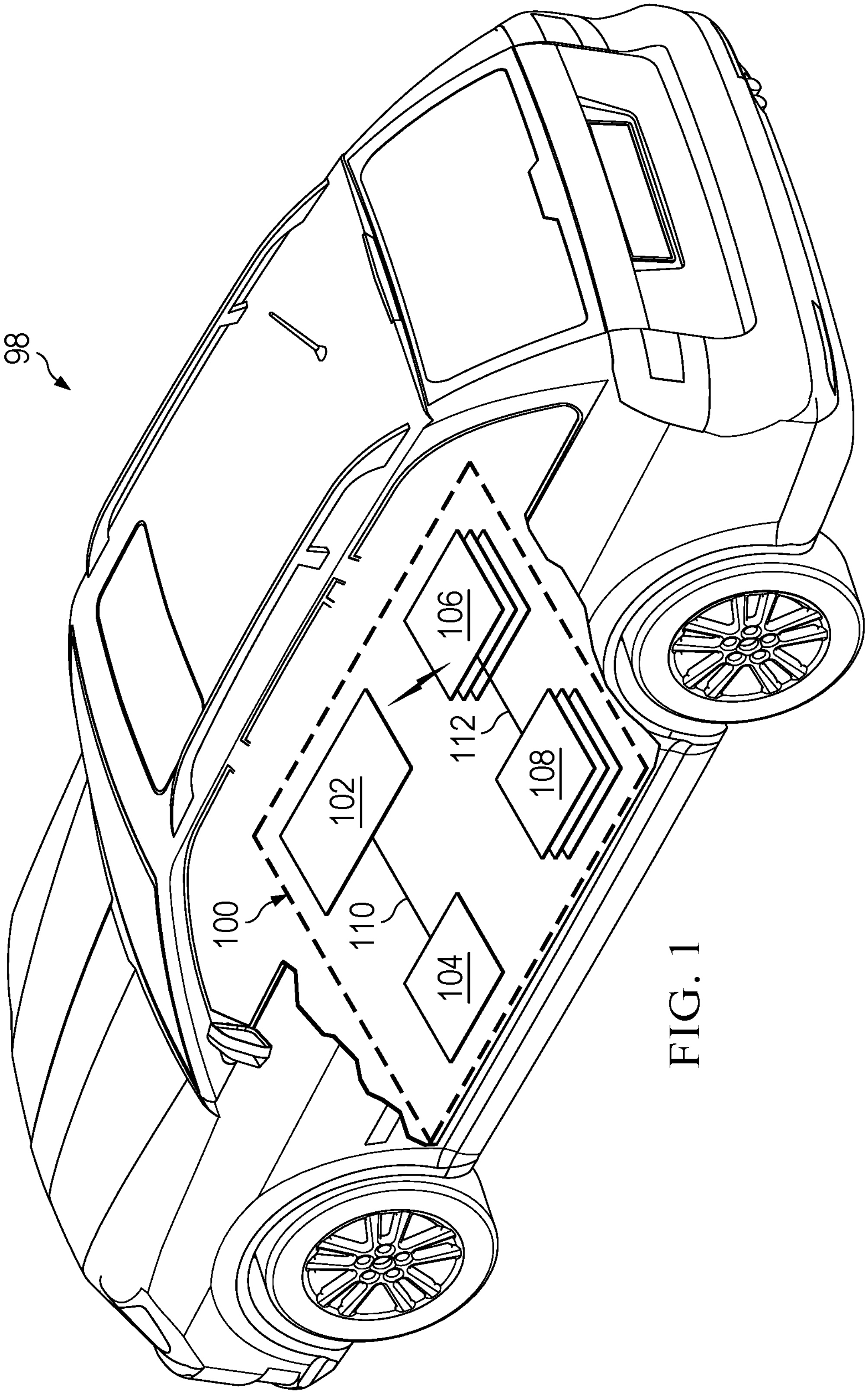
FIG. 1 is a perspective view of an example system, such as an automotive vehicle, that includes a wireless battery management system (WBMS) in accordance with various examples.

Some electronic devices operate using batteries. For example, electric vehicles include multiple battery cells that provide power to those vehicles. Because battery cells in an electronic device can provide large amounts of power, and further because the power provided by the battery cells may be vital to the operation of the electronic device, the electronic device may include a system to manage the battery cells.

Battery management systems (BMSs) may manage the battery cells of an electronic device in various ways. For example, a BMS may monitor the health (e.g., voltage, current, temperature) of battery cells in an electronic device. Further, the BMS may control various battery cells to manage the quantity of power provided by the battery cells and where that power is directed within the electronic device. Generally, a BMS includes multiple components, such as multiple battery modules and a controller to manage the battery modules. Each battery module, in turn, may couple to multiple battery cells and include a battery monitor to monitor those battery cells. Thus, the battery cells coupled to a battery module provide power to the electronic device; the battery monitor in the battery module monitors the health and operation of the battery cells in that battery module; and the controller communicates with the battery monitor to ensure the battery module and its cells are operating properly. The controller may also communicate with the battery monitor to control the operation of the battery cells, such as to turn on, turn off, redirect, or otherwise balance the power provided by those battery cells.

BMSs may incorporate wireless technology to create a wireless battery management system (WBMS). For example, a primary network node contains or is coupled to a controller and a secondary network node contains a battery module that controls multiple battery cells. The primary and secondary network nodes (e.g., the main/master node and the end nodes) may communicate with each other wirelessly, for example using radio frequencies. In some protocols, a super frame (SF) is useful to facilitate wireless communications between the primary and secondary network nodes. In the SF, the primary network node first broadcasts a downlink communication (or packet) to multiple secondary network nodes. The secondary network nodes individually respond to the primary network node with uplink communications (or packets) in a serial manner. Additional example details of WBMSs can be found in commonly assigned U.S. patent application Ser. No. 17/828,895, entitled "Efficient Unicast Super Frame Communications," filed on May 31, 2022, which is incorporated by reference in its entirety. Additional example details of WBMSs can be found in commonly assigned U.S. patent application Ser. No. 17/397,636, entitled "Wireless Battery System and Related Methods," filed on Aug. 9, 2021, which is incorporated by reference in its entirety.

In some systems, the network nodes are not actively receiving or listening all the time, but instead each node periodically samples the channel with a given period between sampling intervals. The nodes, particularly the secondary network nodes, may not be synchronized with one another (e.g., when in a low-power state, and/or when the vehicle/system is powered down). Any node that has to transmit information may be configured to send a long, repetitive transmission of a series of frames that can be sampled by other nodes. This transmission could be intended to wake up one or more other nodes from a low-power state (e.g., a wake-up frame). From the sampled transmission, the other nodes decide their next operation, such as waking up and listening to the transmission, or to ignore the transmission and resume sleeping. There may be no mechanism to schedule these transmissions, which means collisions with transmissions from other nodes are possible. In some systems, a node includes a collision avoidance mechanism that operates by sampling the channel before starting the train of transmissions. However, transmissions from different nodes may start at the same or a similar instant. This can occur if the nodes are monitoring or sensing similar metrics or parameters, which trigger simultaneously, such as battery temperature sensors in a WBMS that trigger in case of a fire or thermal runaway. A node can compare the monitored parameter to a threshold to determine if and when to transmit wake-up frames to the other nodes in the network. Additional example details of wake-up frames in a WBMS can be found in commonly assigned U.S. patent application Ser. No. 18/454,652, entitled "Wireless Battery Management Reverse Wake Up," filed on Aug. 23, 2023, which is incorporated by reference in its entirety.

In examples herein, a node may randomly, or at a preset time, pause the transmission of the train of wake-up frames for a duration of time, and receive transmissions on the channel during that pause duration (e.g., a listening period). If the node detects no other transmissions during the listening period, the node may be configured to continue transmitting after an end of the listening period. If the node detects another ongoing transmission, the node may be configured to keep listening, rather than restart its transmission of wake-up frames. If the node determines that the decoded wake-up frames on the channel are a lower priority, the node may be configured to wait for a silence (e.g., when the lower-priority node pauses its transmissions), and then re-start the transmission of its train of wake-up frames in the silence. A node with higher priority may be configured to continue its transmission of wake-up frames in case of a collision detected with another node of lower priority. In other words, a higher-priority node may be configured to ignore the transmissions of a lower-priority node by continuing to transmit wake-up frames. In another example, a node with the highest priority does not have to detect collisions if it is the only node with that priority. The highest-priority node can transmit a train of wake-up frames without pausing to listen for other nodes.

In an example, the train of wake-up frames may be paused by skipping the kth wake-up frame transmission. The value k may be randomly assigned to a node (e.g., by the primary node, by a programmer, or by a user), may be randomly generated by the node, or may be assigned or generated based on priority. Each node may have a different value of k in one example.

By pausing the transmission of wake-up frames, a first node may be able to detect a second node that is transmitting wake-up frames. The first node can halt its transmissions to reduce the interference caused by two or more nodes sending overlapping frames. By choosing when to pause, the first node can pause while the second node is still transmitting wake-up frames. When the first node determines the instant to pause randomly or based on priority, the first and second node are less likely to pause at the same time. In such examples, the first and second nodes are more likely to detect each other's transmissions. In addition, the first node can decide whether to halt or continue its transmission based on the relative priority of the first node. Thus, only the higher priority node will be transmitting wake-up frames after both nodes have paused. This scenario reduces interference and increases the likelihood that other network nodes detect the wake-up frames. Of course, these advantages are merely examples, and no advantage is required for any particular embodiment.

FIG. 1 is a perspective view of an example system 98, such as an automotive vehicle, that includes a WBMS 100, in accordance with various examples herein. Although system 98 is described in the automotive context, the techniques of this disclosure may be implemented in other systems such as home automation, industrial automation, and wireless sensor networks. In some examples, the system 98 is any system that may include a WBMS 100 to supply power to one or more components of the system 98. As shown, WBMS 100 includes a primary network node 102, a battery controller 104, a plurality of secondary network nodes 106, and a plurality of battery cells 108. In one example, the primary network node 102 may be a wireless main (WM), and the secondary network nodes 106 may be wireless heads (WHs) and wireless devices (WDs) arranged in a hierarchical structure, with the WDs arranged in sub-clusters and each sub-cluster having a WH to manage its respective WDs. Additional example details of a hierarchical structure in a WBMS can be found in commonly assigned U.S. patent application Ser. No. 18/345,636, entitled "Hierarchical Wireless Battery Management System," filed on Jun. 30, 2023, which is incorporated by reference in its entirety. Although this disclosure describes communication techniques primarily in the context of wireless systems, these techniques may also be useful for wired systems (e.g., where the connections between primary network node 102 and secondary network nodes 106 is wired).

In an example, the primary network node 102 is coupled to the battery controller 104 using a first wired connection 110. In an example, the first wired connection 110 between the primary network node 102 and the battery controller 104 is a universal asynchronous receiver/transmitter (UART), inter-integrated circuit (I2C), or the like. The secondary network nodes 106 are wirelessly coupled to the primary network node 102 (e.g., the WM). The WDs in the secondary network nodes 106 are coupled to the battery cells 108 using a second wired connection 112. Although FIG. 1 shows a single primary network node 102 and a single battery controller 104, other example network architectures having multiple primary/main nodes may be used to implement the techniques of this disclosure. Additional example details of multiple main nodes in a WBMS can be found in commonly assigned U.S. patent application Ser. No. 17/823,138, entitled "Multiple Primary Nodes for Wireless Battery Management System Robustness," filed on Aug. 30, 2022, which is incorporated by reference in its entirety.

In an example, WBMS 100 provides wireless radio frequency (RF) communication between the primary network node 102 and the secondary network nodes 106 (and between the WHs and the WDs, in a hierarchical structure). In an example, the wireless RF communication uses the license-free 2.4 gigahertz (GHz) industrial, scientific, and medical (ISM) band from 2.4 GHz to 2.483 GHZ, which is compliant with BLUETOOTH special interest group (SIG). In examples, WBMS 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which WBMS 100 uses to wirelessly communicate between the primary network node 102 and the WHs of the secondary network nodes 106. In an example, the transmission power of WBMS 100 is less than or equal to 10 decibel-milliwatts (dBm).

In an example, the wireless RF communication between the primary network node 102 and the secondary network nodes 106 utilizes frequency hopping and time slotted allocations to transmit and receive data across SFs. An SF, also referred to as a super frame interval, is a time interval including time and frequency allocations for data exchanges between the primary network node 102 and the secondary network nodes 106, including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the WBMS 100 uses frequency division multiple access (FDMA) and changes the frequency at which frames are transmitted between the primary network node 102 and the respective secondary network nodes 106 to increase robustness against interference. In an example, the WBMS 100 uses frequency hopping tables, black listing of frequencies, and configuration channels to mitigate interference with other wireless networks. Frequency hopping occurs on a per SF basis, where during the SF, time slotted allocations are used for frame exchange. Black listing is suspending the use of frequency channels that may be susceptible to interference. Configuration channels may be used for scanning, pairing, and negotiating communication between the primary network node 102 and the secondary network nodes 106.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. In an example, a single channel may be used as a configuration channel.

In an example, WBMS 100 supports periodic and a-periodic data exchanges from the secondary network nodes 106 to the primary network node 102 using wireless RF communication. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the WBMS 100.

In an example, the primary network node 102 scans the network to obtain a master ID and discover the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state. Additional example details of establishing a communication channel can be found in commonly assigned U.S. Patent Application Publication No. 2022/0332213, entitled "Wireless Protocol for Battery Management," filed on Apr. 16, 2021; and U.S. Patent Application Publication No. 2023/0051689, entitled "Wireless Battery Management System Setup," filed on Aug. 11, 2021, each of which is incorporated by reference in its entirety.

In an example, transmission cycles or SFs depend on the number of secondary network nodes 106 and/or battery cells 108 in the network. The primary network node 102 determines the SF interval based on the number of secondary network nodes 106. Given a number of secondary network nodes 106, the primary network node 102 estimates the number of DL slots usable to transmit the packets to the secondary network nodes 106. Accordingly, the total number of slots in the communication time interval becomes the following:

$$\text{Total\_slots} = \text{nr\_of\_WD} + \text{nr\_DL\_slots},$$

where nr_of_WD is the number of secondary network devices and nr_DL_slots is the number of DL slots available to the secondary network nodes 106.

WBMS 100 manages the battery cells 108 using the primary network node 102, the battery controller 104, and the secondary network nodes 106. The primary network node 102 and the secondary network nodes 106 communicate with each other about the state of the battery cells 108. The primary network node 102 and the secondary network nodes 106 may communicate with or among each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 that the condition is present. The primary network node 102 receives the notification of the condition from the secondary network nodes 106 and alerts the battery controller 104 of the condition. The battery controller 104 determines a proper reaction to the condition and sends an instruction to the primary network node 102. The primary network node 102 transmits the instruction to the secondary network nodes 106. The secondary network nodes 106 receive the instruction to manage the battery cells 108 in response to the condition. The secondary network nodes 106 manage the battery cells 108 in response to the condition.

Figure 2A:
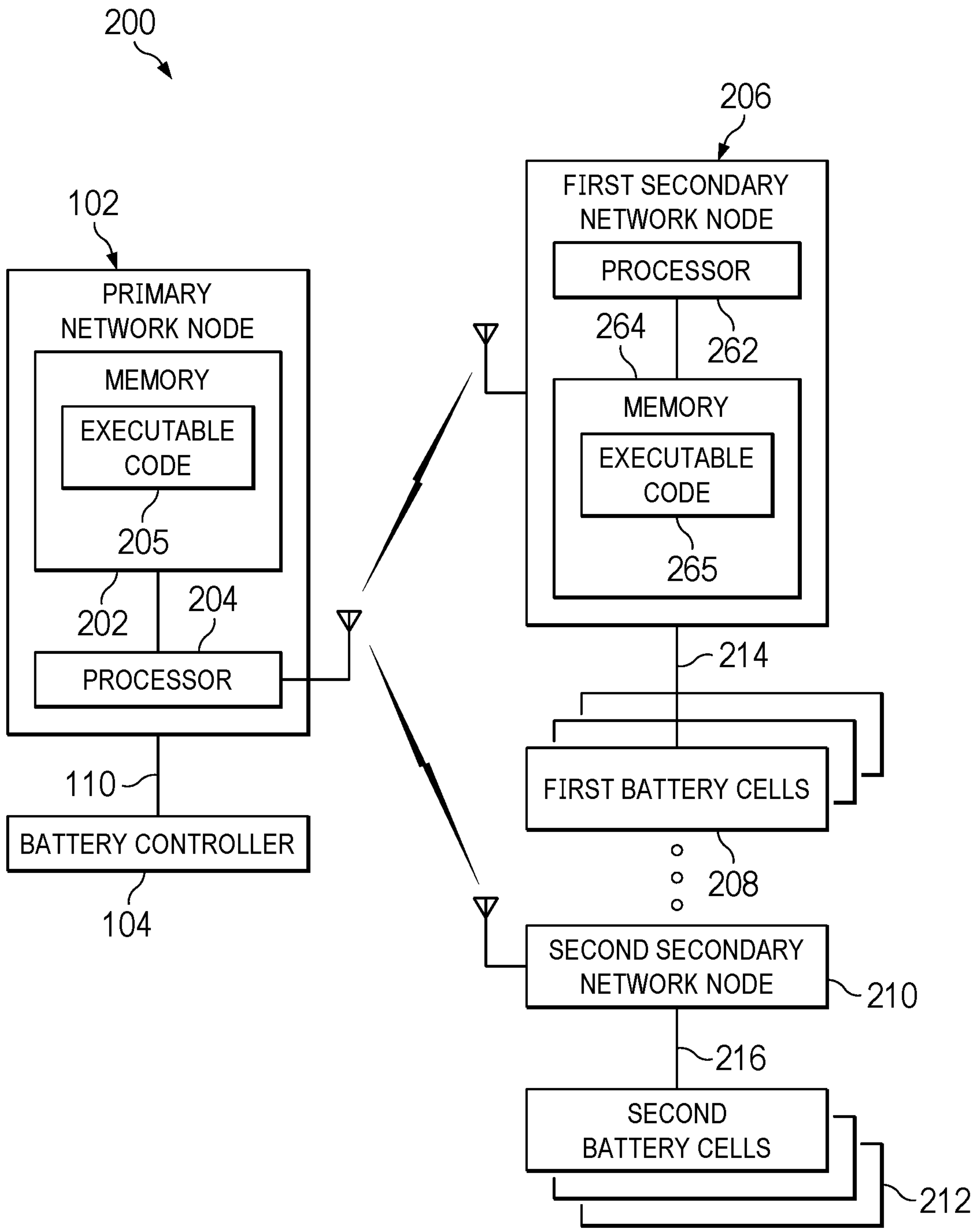
FIG. 2A is a WBMS in accordance with various examples.

FIG. 2A illustrates an example WBMS 200. WBMS 200 is an example of WBMS 100 described above. As shown, WBMS 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. The primary network node 102 includes the memory 202 and the processor 204 that is configured to execute code 205 stored on the memory 202 to perform one or more of the actions attributed herein to the primary network node 102. In an example, a portion of the memory 202 may be non-transitory and a portion of the memory 202 may be transitory. The secondary network nodes 206, 210 also may include processors and memory. For example, as shown, the first secondary network node 206 includes a processor 262 coupled to a memory 264 storing executable code 265 that is executable by the processor 262 to perform one or more of the actions attributed herein to the first secondary network node 206. A processor as described herein may include any suitable processor or combination of processors. For example, a processor, such as processor 204 or 262, may be a central processing unit (CPU), digital signal processor (DSP), a microcontroller unit (MCU), a DSP+MCU processor, a field programmable gate array (FPGA), processing circuitry, or an application specific integrated circuit (ASIC). A primary network node 102 and secondary network nodes 106 may also include transmitter and receiver circuits or circuitry (e.g., a transceiver circuit) configured to perform the operations described herein. The transmitter and receiver circuitry may include any suitable hardware or software for performing the operations described herein.

The primary network node 102 is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the WBMS 200; rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least sixteen battery cells using a wired connection. In examples, the WBMS 200 includes one primary network node. In other examples, the WBMS 200 includes multiple primary network nodes, with each network having its own hierarchical structure.

WBMS 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the primary network node 102 that the condition is present. The primary network node 102 receives the notification of the condition from the first secondary network node 206 and alerts the battery controller 104 of the condition. The battery controller 104 determines a proper reaction to the condition and sends an instruction to the primary network node 102. The primary network node 102 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212. If the WBMS 200 uses a hierarchical structure as described above, the WM communicates with the WHs, and the WHs communicate with the respective WDs and then relay the responses from the WDs back to the WM.

Figure 2B:
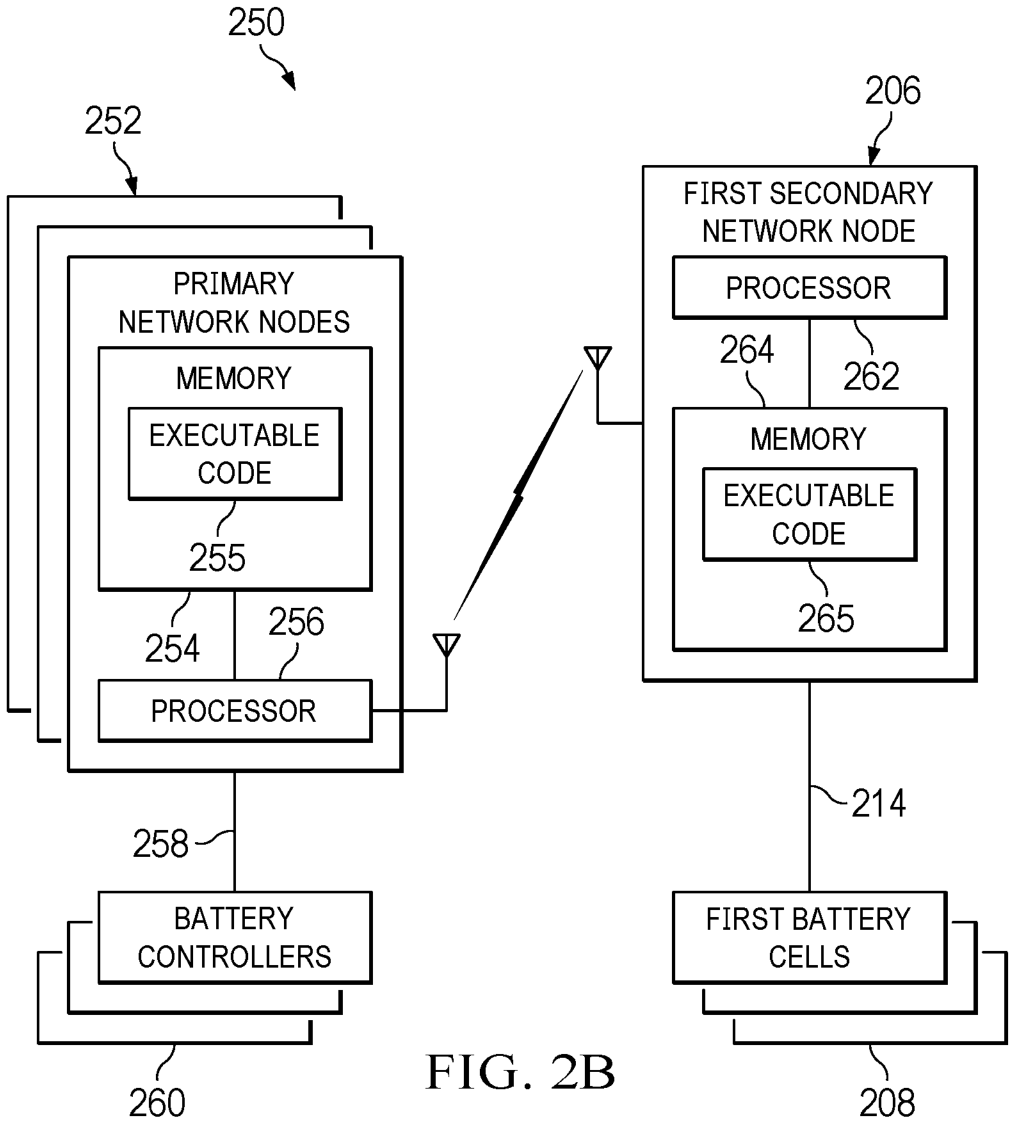
FIG. 2B is a WBMS in accordance with various examples.

FIG. 2B illustrates an example WBMS 250. WBMS 250 is an example of WBMS 100 described above. As shown, WBMS 250 includes the first secondary network node 206, the first plurality of battery cells 208, a plurality of primary network nodes 252, a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory. In examples, the memory 254 includes executable code 255 which, when executed by the processor 256, causes the processor 256 to perform the actions attributed herein to the plurality of primary network nodes 252.

The plurality of primary network nodes 252 are coupled to the plurality of battery controllers 260 using the first wired connection 258 and are wirelessly coupled to the first secondary network node 206. The first secondary network node 206 is coupled to the first plurality of battery cells 208 using the third wired connection 214 and wirelessly coupled to the plurality of primary network nodes 252. As shown in FIG. 2B, the first secondary network node 206 may include a processor and memory (e.g., processor 262 and memory 264). FIG. 2B does not limit the number of secondary network nodes in the WBMS 250. In an example, each of the plurality of primary network nodes 252 is wirelessly coupled to at least eight secondary network nodes. In an example, the first secondary network node 206 can be coupled to at least sixteen battery cells using the fourth wired connection 216.

WBMS 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the plurality of primary network nodes 252 that the condition is present. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
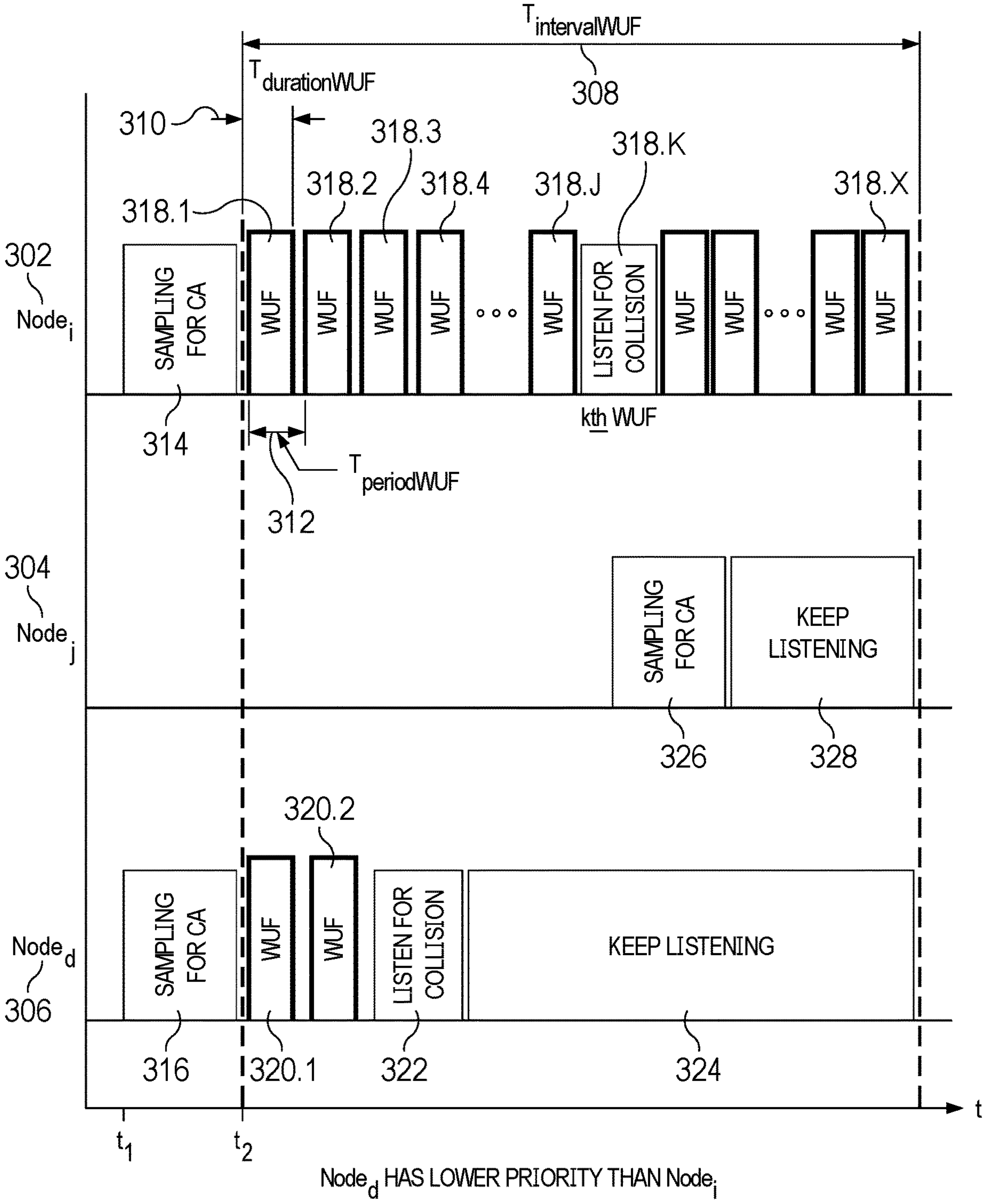
FIG. 3 is a procedure for collision detection and avoidance in accordance with various examples.

FIG. 3 is a procedure 300 for collision detection and avoidance in accordance with various examples herein. In this example, procedure 300 has three example nodes 302 ($Node_i$), 304 ($Node_j$), and 306 ($Node_d$). Any number of nodes may be present in other examples. Nodes 302, 304, and 306 may be secondary network nodes in one example. In other examples, one of nodes 302, 304, or 306 may be a primary network node. Procedure 300 includes a wake-up frame interval $T_{intervalWUF}$ 308, a wake-up frame duration $T_{durationWUF}$ 310, and a wake-up frame period $T_{periodWUF}$ 312. The x-axis in FIG. 3 indicates time.

In procedure 300, node 306 ($Node_d$) has a lower priority than node 302 ($Node_i$). At time $t_1$, an event occurs that causes nodes 302 and 306 to wake up at the same time or close to the same time. The event may be triggered by a metric monitored by nodes 302 and 306, such as battery temperature sensors, pressure sensors, and/or voltage sensors in the WBMS. Nodes 302 and 306 will send reverse wake-up frames to other nodes (e.g., other secondary network nodes and possibly a primary network node) responsive to the event. Before sending the wake-up frames, nodes 302 and 306 first sample for collision avoidance. Node 302 conducts sampling 314, and node 306 conducts sampling 316. Nodes 302 and 306 sample for collision avoidance (CA) by checking to see if any transmissions are occurring on the channel. In this example, no transmissions are occurring, so nodes 302 and 306 can continue by sending wake-up frames after sampling.

At time $t_2$, both nodes 302 and 306 begin sending their wake-up frames. Each wake-up frame has a duration $T_{durationWUF}$ 310. The wake-up frames also have a period $T_{periodWUF}$ 312, which is the period between the start of consecutive wake-up frames. The wake-up frames may be sent during a certain interval $T_{intervalWUF}$ 308. Node 302 sends wake-up frames 318 (e.g., 318.1, 318.2, . . . 318.N), and node 306 sends wake-up frames 320 (e.g., 320.1 and 320.2).

In this example, node 306 sends wake-up frames 320.1 and 320.2 and then pauses to listen to the channel for a collision. Node 306 listens for collision 322, and then keeps listening 324 if it detects a collision. In this example, node 306 listens after wake-up frame 320.2. During listening for collision 322, node 306 detects the wake-up frames 318 transmitted by node 302. Node 302 has continued sending wake-up frames 318 during node 306's listening period. Because node 306 detects the wake-up frames 318, node 306 continues listening at keep listening 324.

Node 306 has a lower priority than node 302 in this example. Node 306 may determine its relative priority compared to node 302 using any suitable method. In one example, the wake-up frames from node 302 may indicate a priority, and node 306 may determine that it has lower priority than node 302. Priority amongst nodes may be determined or programmed prior to the events shown in procedure 300, for example, based on the relative locations, positions, and/or signal strengths of the nodes. In this example, node 306 is also programmed to transmit two wake-up frames (320.1 and 320.2) before listening for collision 322. Node 306 therefore has been assigned a k value of 2, where k is the number of wake-up frames 320 to send before listening. The value k may be randomly assigned to each node (e.g., a preset value that is stored to memory in the node), k may be randomly generated by the node, or k may be assigned to or generated by a node based on priority. In some examples, each node may store a set of possible k values, where each node's set of k values is disjoint from all other nodes' sets of k values, such that two nodes never select the same k value. In this example, node 302 has a k value that is larger than 2. Therefore, node 302 transmits wake-up frames 318.1, 318.2, . . . 318.J, and then pauses to listen at the kth wake-up frame 318.K. At the time of wake-up frame 318.K, node 306 is in the keep listening 324 phase. Also, node 304 has not transmitted any wake-up frames. Therefore, node 302 listens at the time of the kth wake-up frame 318.K and finds silence on the channel. After listening for a predetermined amount of time, node 302 continues sending wake-up frames 318 for the rest of $T_{intervalWUF}$ 308. Node 306 remains in the phase keep listening 324 due to detecting the higher priority wake-up frames 318 from node 302.

In this example, node 304 does not wake up until period 326. Upon wake-up, node 304 samples the channel for collision avoidance. In one example, node 304 samples for a long enough time to capture a wake-up frame transmitted by another node (e.g., by node 302). Node 304 may also sample for a long enough time that a listening period (e.g., 318.K) for another node completes. In this example, node 304 samples the channel and detects a wake-up frame from node 302. Because node 302 has higher priority than node 304 in this example, node 304 keeps listening 328 after it detects the wake-up frame 318 (e.g., the first wake-up frame 318 after the listening period 318.K). As the lower priority node detecting higher priority transmission, node 304 may be configured to take action based on the contents of the decoded frame received from node 302.

In this example, the nodes 302 and 306 wake up and begin transmitting wake-up frames at approximately the same time. However, because the nodes 302 and 306 pause and listen at different times during their respective train of wake-up frames, collisions are detected and/or avoided. By reducing or avoiding collisions, nodes 302 and 306 can reduce or eliminate interference caused by simultaneous trains of wake-up frames. One of the nodes (node 306) pauses to listen first, and then keeps listening after it detects higher priority transmissions from node 302. Node 302 pauses later than node 306 in this example (e.g., node 302 has a higher assigned k value). Pausing at different times reduces the likelihood that the node 302 or node 306 does not detect the wake-up frames sent by the other node. Node 304 operates similarly to the other two nodes, by sampling the channel after wake-up before transmitting wake-up frames.

Figure 4:
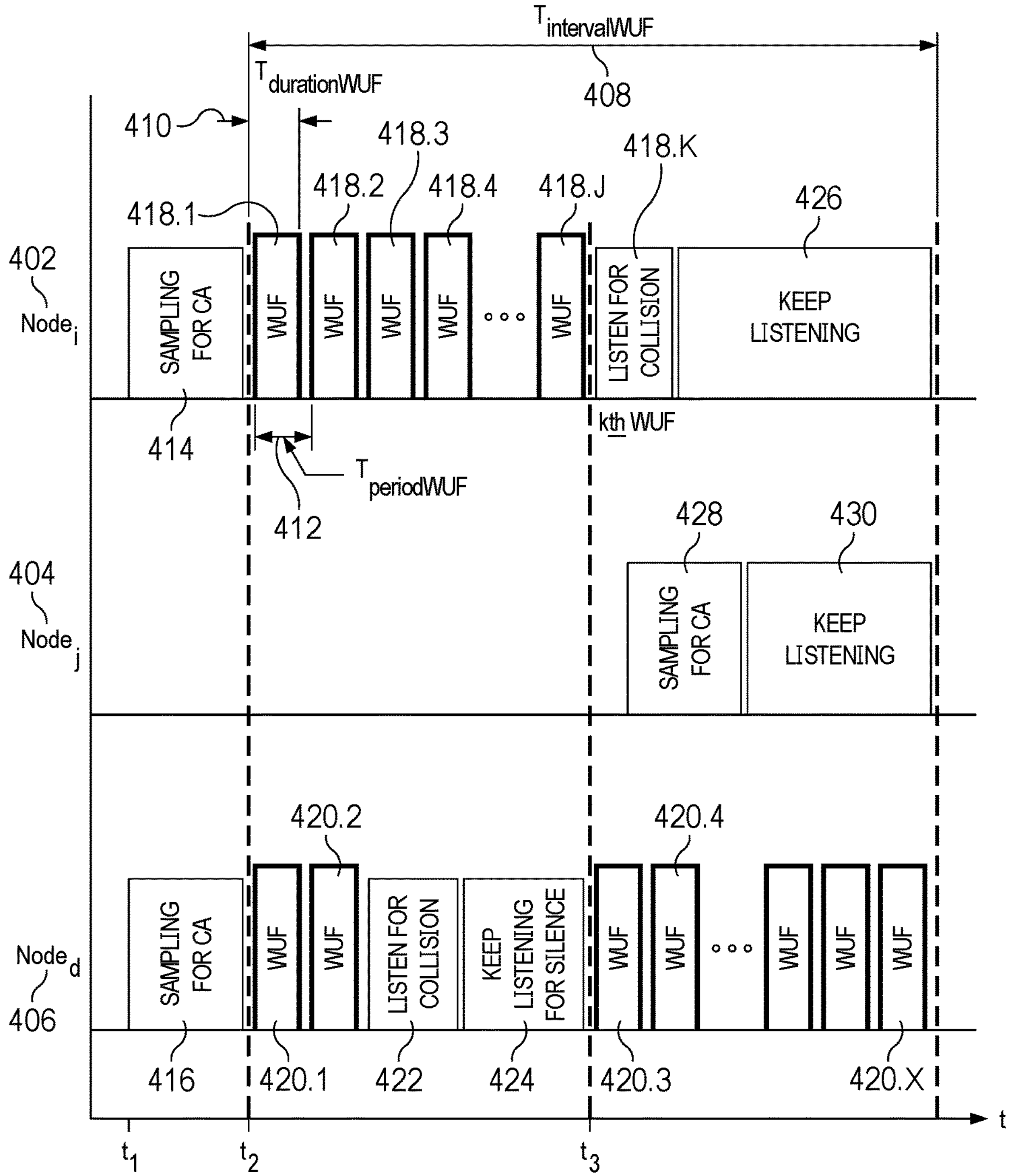
FIG. 4 is a procedure for collision detection and avoidance in accordance with various examples.

FIG. 4 is a procedure 400 for collision detection and avoidance in accordance with various examples herein. In this example, procedure 400 has three example nodes 402 ($Node_i$), 404 ($Node_j$), and 406 ($Node_d$). Any number of nodes may be present in other examples. Nodes 402, 404, and 406 may be secondary network nodes in one example. In other examples, one of nodes 402, 404, or 406 may be a primary network node. Procedure 400 includes a wake-up frame interval $T_{intervalWUF}$ 408, a wake-up frame duration $T_{durationWUF}$ 410, and a wake-up frame period $T_{periodWUF}$ 412. The x-axis in FIG. 4 indicates time.

In procedure 400, node 406 ($Node_d$) has a higher priority than node 402 ($Node_i$). At time $t_1$, an event occurs that causes nodes 402 and 406 to wake up at the same time or close to the same time. Nodes 402 and 406 will send reverse wake-up frames to other nodes (e.g., other secondary network nodes and possibly a primary network node) responsive to the event. Before sending the wake-up frames, nodes 402 and 406 first sample for collision avoidance. Node 402 conducts sampling 414, and node 406 conducts sampling 416. Nodes 402 and 406 sample for collision avoidance by checking to see if any transmissions are occurring on the channel. In this example, no transmissions are occurring, so nodes 402 and 406 can continue by sending wake-up frames after sampling.

At time $t_2$, both nodes 402 and 406 begin sending their wake-up frames. Each wake-up frame has a duration $T_{durationWUF}$ 410. The wake-up frames also have a period $T_{periodWUF}$ 412, which is the period between the start of consecutive wake-up frames. The wake-up frames may be sent during a certain interval $T_{intervalWUF}$ 408. Node 402 sends wake-up frames 418 (e.g., 418.1, 418.2, . . . 418.N), and node 406 sends wake-up frames 420 (e.g., 420.1 and 420.2).

In this example, node 406 sends wake-up frames 420.1 and 420.2 and then pauses to listen to the channel for a collision. Node 406 listens for collision 422, and then listens for silence 424 if it detects a collision. In this example, node 406 listens after wake-up frame 420.2. During listening for collision 422, node 406 detects the wake-up frames 418 transmitted by node 402. Node 402 has continued sending wake-up frames 418 during node 406's listening period.

Node 406 has a higher priority than node 402 in this example. Therefore, node 406 detects the wake-up frames 418 during listen for collision 422, and determines that these wake-up frames 418 are lower priority than wake-up frames 420. Then, node 406 listens for silence 424. At the time of the kth wake-up frame from node 402 (418.K, at time $t_3$), node 402 stops transmitting wake-up frames 418 and goes silent. At time $t_3$, node 406 detects silence on the channel and begins transmitting its wake-up frames 420 again (e.g., 420.3, 420.4, etc.). Node 406 begins transmitting these wake-up frames after detecting silence because node 406 has higher priority than node 402. The various wake-up frames transmitted by the nodes may indicate their respective priorities in one example, for example, by including a field having a value indicating the priority.

At time $t_3$, node 402 pauses and listens for collisions. Node 406 begins transmitting shortly after time $t_3$. Node 402 then detects the wake-up frames 420 from node 406. Because the wake-up frames from node 406 have higher priority than the wake-up frames 418 from node 402, node 402 keeps listening at 426, rather than re-starting the transmission of wake-up frames.

Node 404 wakes up after time $t_3$ and first samples for collision avoidance 428. Node 404 detects the wake-up frames from node 406 (e.g., wake-up frames 420). Node 404 has lower priority than node 406 in this example, and keeps listening 430 to the wake-up frames 420 from node 406.

Figure 5:
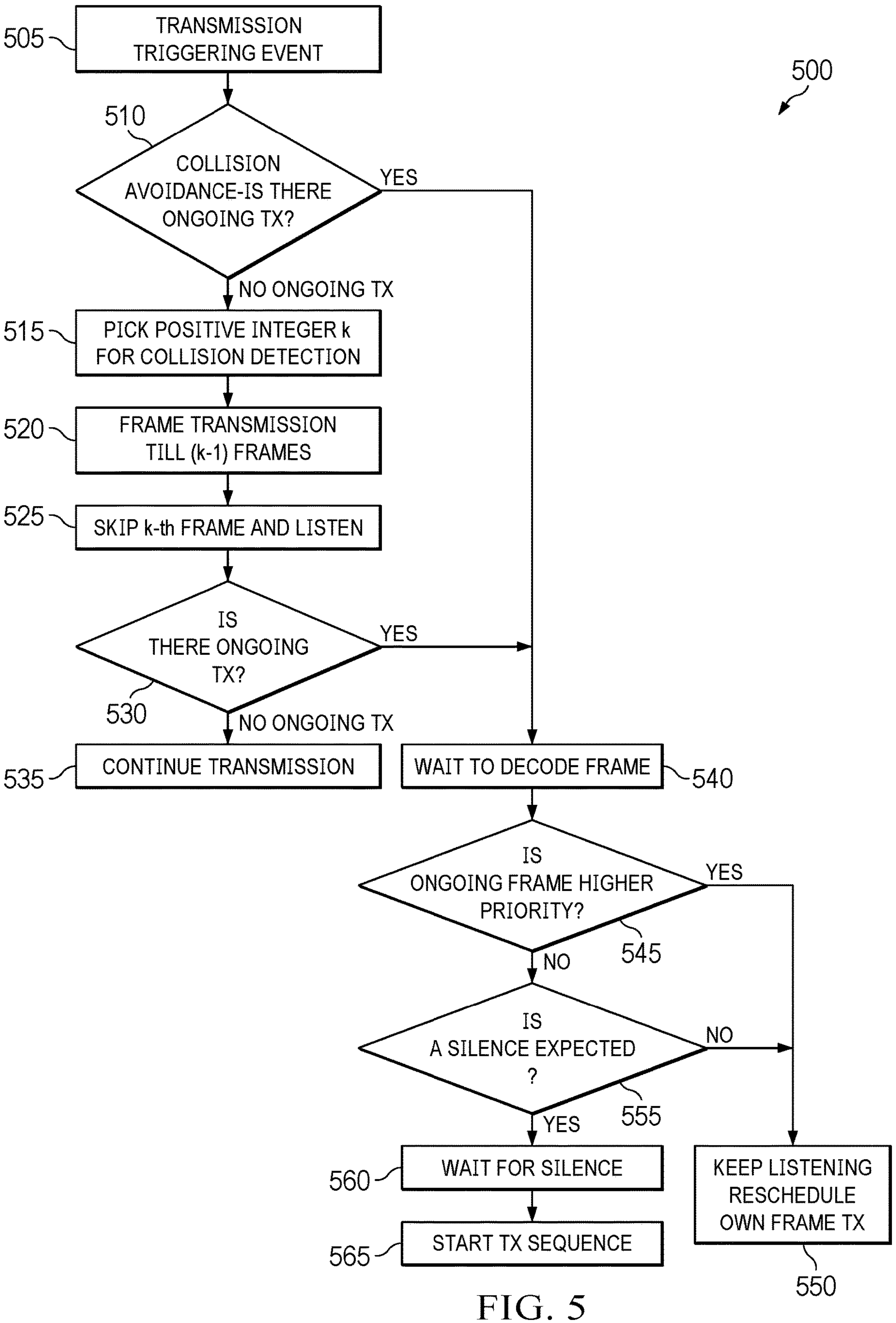
FIG. 5 is a flow diagram of a method for node collision detection and avoidance in accordance with various examples.

FIG. 5 is a flow diagram of a method 500 for node collision detection and avoidance in a WBMS in accordance with various examples herein. The steps of method 500 may be performed in any suitable order. The hardware components described above with respect to FIGS. 1-2B may perform method 500 in some examples. Any suitable hardware, software, or digital logic may perform method 500 in some examples.

Method 500 begins at 505, where an event triggering transmission of wake-up frames occurs. The event may be triggered by a metric monitored by nodes in the WBMS, such as battery temperature sensors in the WBMS that detect a fire. Multiple nodes may be triggered at or near the same time.

Method 500 continues at 510, where a first node that wakes up performs a collision avoidance procedure. The first node checks its assigned channel to determine if there is an ongoing transmission from a second node. If there is an ongoing transmission, the method continues at 540, described below. If there is not an ongoing transmission (e.g., the channel is clear), method 500 proceeds to 515.

At 515, a positive integer k is selected for collision detection by the first node. The positive integer k may be pre-assigned to the first node in another example. The positive integer k may be based on priority in some examples. In some systems, each node has a unique assigned k. In some systems, k is selected from a large set of numbers so that the probability of non-unique k values is small. In other systems, the value of k is unique for each node. Instead of selecting the integer k, the first node may be configured to select another integer, such as $k-1$ (i.e., the number of wake-up frames to transmit).

Method 500 proceeds to 520. At 520, $k-1$ wake-up frames are transmitted by the first node. For example, if k is 8, 7 wake-up frames are transmitted by the first node.

Method 500 proceeds to 525, where the kth frame is skipped and the first node pauses transmission to listen to the channel. In this example, the $8^{th}$ (k) frame is skipped, and the first node listens for other transmissions on the channel.

Method 500 continues at 530, where the first node determines if there is an ongoing transmission during the listening period. The first node can determine that there is an ongoing transmission by determining that the first node received a wake-up frame while skipping the kth frame. If other transmissions are detected, the method proceeds to 540. If no other transmissions are detected, the method proceeds to 535.

At 535, the first node has not detected other transmissions during the listening period, and therefore the first node continues transmitting its wake-up frame during the wake-up frame interval.

At 510 or at 530, if the first node detects other transmissions on the channel received from a second node, method 500 proceeds to 540. At 540, the first node receives the other transmissions from the second node and decodes the received frame(s). The frame(s) received from the second node are decoded by the first node to determine the priority of the received transmissions.

Method 500 then proceeds to 545. At 545, the first node determines if the received frames are higher priority than the first node's own wake-up frames. If the received frames are higher priority, the method proceeds to 550 where the first node keeps listening to the higher priority frames. The first node does not transmit additional wake-up frames, but rather reschedules its own frames for a later time when the channel is clear. In some examples, the wake-up frames may be not be rescheduled, because the first node receives other instructions from a higher priority transmission from another node.

At 545, if the received frames are not higher priority than the first node's own wake-up frames, the method proceeds to 555. At 555, the first node determines if silence is expected. If silence is not expected, the method proceeds to 550, and the first node keeps listening as described above. If silence is expected in the train of received wake-up frames from the second node, the method proceeds to 560.

At 560, the first node waits for the expected silence. The silence from the received wake-up frames may begin after the second node has transmitted k frames, where k is the positive integer value assigned to the second node. The first node may wait any amount of time for the silence on the channel to occur.

After silence is detected, method 500 proceeds to 565. At 565, the first node begins its transmission sequence of wake-up frames again. The first node may transmit until $k-1$ frames are transmitted, as described above at 520. In this example, the first node waits until the lower priority transmissions stop before resuming its own transmissions. In other examples, a higher priority node may begin transmitting without waiting for lower priority transmissions to stop on the channel. In those examples, the lower priority transmissions will eventually stop, and at that time the transmissions from the higher priority node will be the only transmissions on the channel. The lower priority transmissions will stop because the lower priority node will detect the transmissions by the higher priority node.

Figure 6:
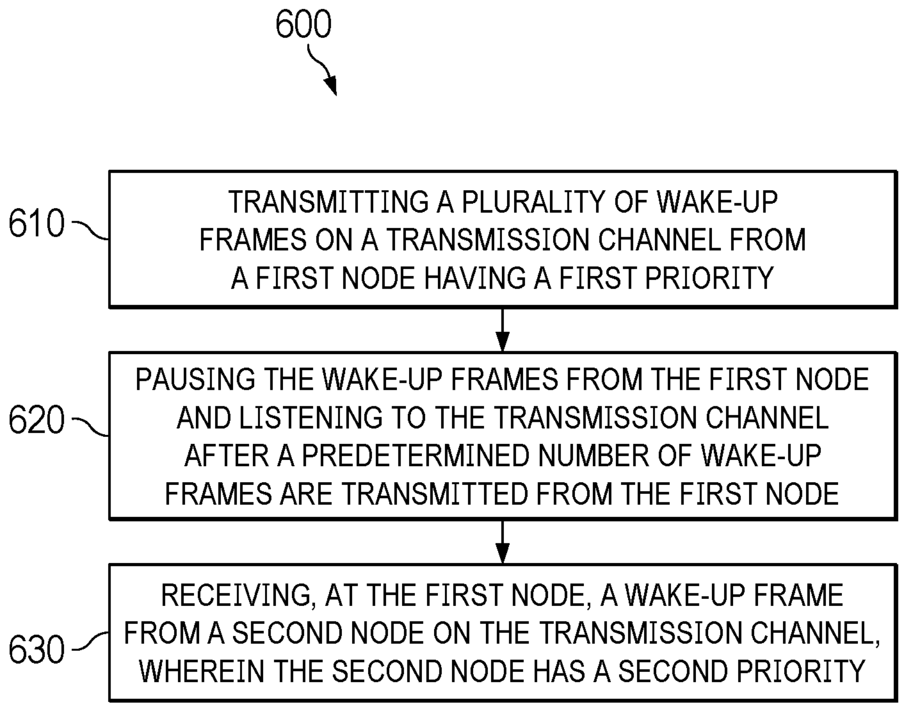
FIG. 6 is a flow diagram of a method for node collision detection and avoidance in accordance with various examples.

FIG. 6 is a flow diagram of a method 600 for node collision detection and avoidance in a WBMS in accordance with various examples herein. The steps of method 600 may be performed in any suitable order. The hardware components described above with respect to FIGS. 1-2B may perform method 600 in some examples. Any suitable hardware, software, or digital logic may perform method 600 in some examples.

Method 600 begins at 610, where a first node transmits a plurality of wake-up frames on a transmission channel having a first priority. As described above, the first node may wake-up due to a triggering event, check the channel for collision avoidance, and then begin transmitting the wake-up frames.

Method 600 continues at 620, where the first node pauses the wake-up frames from the first node and listens to the transmission channel after a predetermined number of wake-up frames are transmitted from the first node. The first node may transmit a number of wake-up frames as determined by a k value assigned to the first node. The k value may be based on the priority of the first node. Higher priority nodes may have higher assigned k values in some examples. Alternatively, a node may randomly generate the k value (e.g., using a random, pseudo-random, or logic function number generator). Pausing the transmissions to listen to the channel helps to detect and avoid collisions as described herein.

Method 600 continues at 630, where the first node receives a wake-up frame from a second node on the transmission channel, where the second node has a second priority. The first node may then determine its next action based on the relative priorities of the first and second nodes. The first node may continue listening in one example, or wait for silence and then continues its own transmission in another example.

Figure 7:
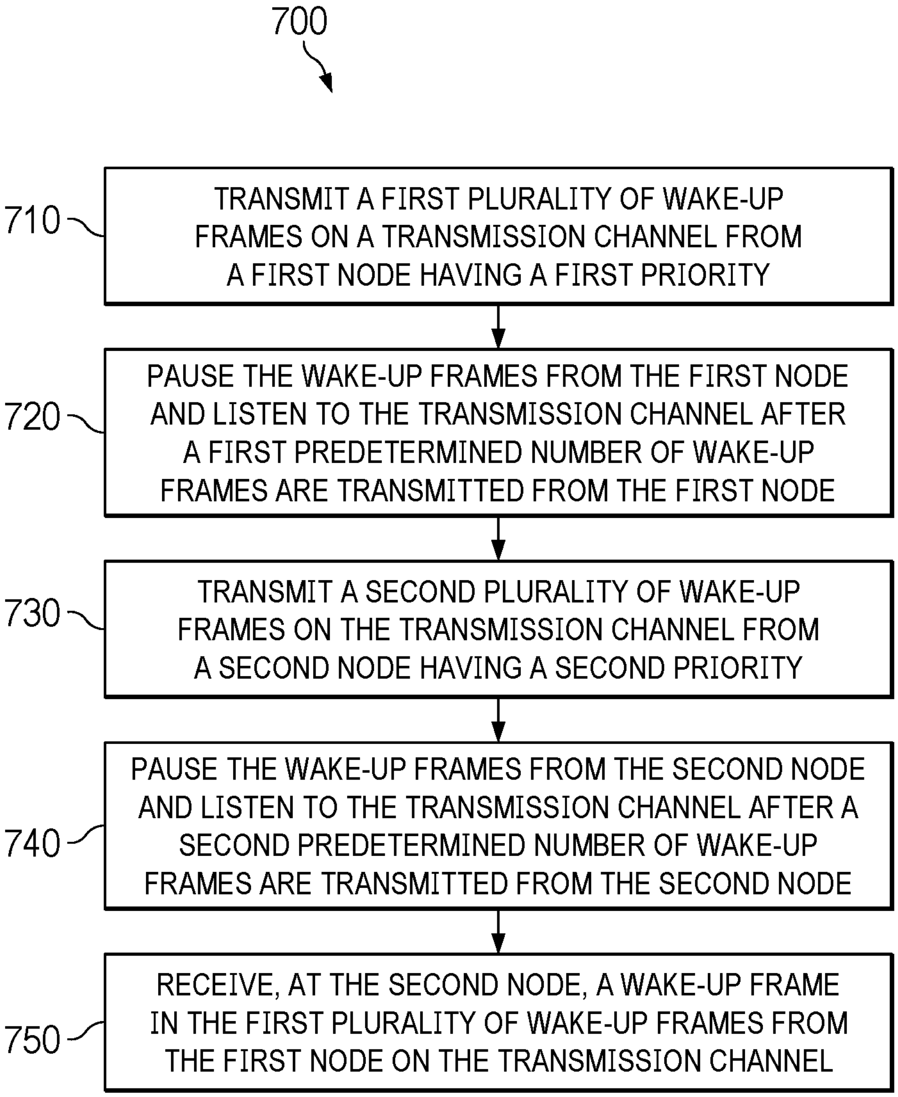
FIG. 7 is a flow diagram of a method for node collision detection and avoidance in accordance with various examples.

FIG. 7 is a flow diagram of a method 700 for node collision detection and avoidance in a WBMS in accordance with various examples herein. The steps of method 700 may be performed in any suitable order. The hardware components described above with respect to FIGS. 1-2B may perform method 700 in some examples. Any suitable hardware, software, or digital logic may perform method 700 in some examples.

Method 700 begins at 710, where a first node transmits a first plurality of wake-up frames on a transmission channel having a first priority. As described above, the first node may wake-up due to a triggering event, check the channel for collision avoidance, and then begin transmitting the wake-up frames.

Method 700 continues at 720, where the first node pauses the wake-up frames from the first node and listens to the transmission channel after a first predetermined number of wake-up frames are transmitted from the first node. The first predetermined number of wake-up frames may be selected based on the value of k assigned to the first node. The first node may send k−1 wake-up frames, and then pause for the kth frame.

Method 700 continues at 730, where a second node transmits a second plurality of wake-up frames on the transmission channel having a second priority. The second priority may be higher or lower than the first priority.

Method 700 continues at 740, where the second node pauses the wake-up frames and listens to the transmission channel after a second predetermined number of wake-up frames are transmitted from the second node. The second predetermined number of wake-up frames may be selected based on the value of k assigned to the second node. The first node and the second node may have different values of k assigned to them, and the values of k may be assigned based on priority in some examples.

Method 700 continues at 750, where the second node receives a wake-up frame in the first plurality of wake-up frames from the first node on the transmission channel. The second node may determine its next action based on the relative priority of the wake-up frames from the first node and the second node, as described above.

In examples herein, a node may pause the transmission of the train of wake-up frames for a duration of time, and receive transmissions on the channel during that duration (e.g., a listening period). If no other transmissions are detected during the listening period, the node continues transmitting after the listening period. If another ongoing transmission is detected, the node May keep listening. If the decoded wake-up frames on the channel are a lower priority, the node may wait for a silence, and then re-start its train of wake-up frames in the silence. Therefore, the train of wake-up frames from a node with higher priority continues its transmission of wake-up frames in case of a collision detected with another node of lower priority. The train of wake-up frames may be paused by skipping the kth wake-up frame transmission. The value k may be randomly assigned to a node, or may be assigned based on priority. Each node may have a different value of k in one example.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A method, comprising:

transmitting a plurality of wake-up frames on a transmission channel from a first node having a first priority;

generating a first number using a random process or a pseudo-random process;

setting a predetermined number of wake-up frames based on the first number;

pausing the wake-up frames from the first node and listening to the transmission channel after the predetermined number of wake-up frames are transmitted from the first node; and receiving, at the first node, a wake-up frame from a second node on the transmission channel, wherein the second node has a second priority.

2. The method of claim 1, further comprising:

responsive to the first priority being higher than the second priority, continue transmitting the plurality of wake-up frames from the first node on the transmission channel.

3. The method of claim 1, further comprising:

responsive to the first priority being higher than the second priority, listening, at the first node, for silence on the transmission channel; and responsive to detecting silence on the transmission channel at the first node, continue transmitting the plurality of wake-up frames from the first node on the transmission channel after listening for silence.

4. The method of claim 1, further comprising:

responsive to the second priority being higher than the first priority, continue listening, at the first node, to the transmission channel for wake-up frames from the second node.

5. The method of claim 1, wherein the predetermined number of wake-up frames is a first predetermined number, wherein the second node transmits a second predetermined number of wake-up frames from the second node before pausing the wake-up frames from the second node, and wherein the first predetermined number and the second predetermined number are selected based on the first priority and the second priority.

6. The method of claim 1, wherein the first node pauses the wake-up frames for at least a wake-up frame period, and wherein the wake-up frame period is a duration of time from a start of a first wake-up frame in the plurality of wake-up frames to a start of a next wake-up frame in the plurality of wake-up frames.

7. The method of claim 1, further comprising:

monitoring a parameter of a battery cell in a wireless battery management system (WBMS);

determining that the monitored parameter does not satisfy a threshold; and transmitting the plurality of wake-up frames responsive to determining that the monitored parameter does not satisfy the threshold.

8. A system, comprising:

a first node in a wireless system, the first node configurable to:

transmit a plurality of wake-up frames on a transmission channel from the first node having a first priority;

generate a first number using a random process or a pseudo-random process;

set a predetermined number of wake-up frames based on the first number;

pause the wake-up frames from the first node and listen to the transmission channel after the predetermined number of wake-up frames are transmitted from the first node; and receive, at the first node, a wake-up frame from a second node on the transmission channel, wherein the second node has a second priority.

9. The system of claim 8, wherein the first node is configurable to, responsive to the first priority being higher than the second priority, continue transmitting the wake-up frames from the first node on the transmission channel.

10. The system of claim 8, wherein the first node is configurable to:

responsive to the first priority being higher than the second priority, listen, at the first node, for silence on the transmission channel; and responsive to detecting silence on the transmission channel at the first node, continue transmitting the plurality of wake-up frames from the first node on the transmission channel after listening for silence.

11. The system of claim 8, wherein the first node is configurable to:

responsive to the second priority being higher than the first priority, continue listening, at the first node, to the transmission channel for wake-up frames from the second node.

12. The system of claim 8, wherein the predetermined number of wake-up frames is a first predetermined number, wherein the second node transmits a second predetermined number of wake-up frames from the second node before pausing the wake-up frames from the second node, and wherein the first predetermined number and the second predetermined number are selected based on the first priority and the second priority.

13. The system of claim 8, wherein the first node pauses the wake-up frames for at least a wake-up frame period, and wherein the wake-up frame period is a duration of time from a start of a first wake-up frame in the plurality of wake-up frames to a start of a next wake-up frame in the plurality of wake-up frames.

14. The system of claim 8, wherein the first node is configurable to:

monitor a parameter of a battery cell in a wireless battery management system (WBMS);

determine that the monitored parameter does not satisfy a threshold; and transmit the plurality of wake-up frames responsive to determining that the monitored parameter does not satisfy the threshold.

15. A system, comprising:

a first node in a wireless system, the first node configurable to:

transmit a first plurality of wake-up frames on a transmission channel from the first node having a first priority; and pause the wake-up frames from the first node and listen to the transmission channel after a first predetermined number of wake-up frames are transmitted from the first node; and a second node in the wireless system, the second node configurable to:

transmit a second plurality of wake-up frames on the transmission channel from the second node having a second priority;

pause the wake-up frames from the second node and listen to the transmission channel after a second predetermined number of wake-up frames are transmitted from the second node; and receive, at the second node, a wake-up frame in the first plurality of wake-up frames from the first node on the transmission channel.

16. The system of claim 15, wherein the first node is configurable to monitor a first battery cell in a wireless battery management system (WBMS), wherein the second node is configurable to monitor a second battery cell in the WBMS, and wherein the first node and the second node transmit their respective wake-up frames responsive to a metric of a battery cell triggering a wake-up process.

17. The system of claim 16, wherein the WBMS includes a primary node and two or more secondary nodes, and wherein the first node is a secondary node in the WBMS.

18. The system of claim 15, wherein the first predetermined number and the second predetermined number are selected based on the first priority and the second priority.

19. The system of claim 15, wherein the first node is configurable to:

generate a first number using a random process or a pseudo-random process; and set the first predetermined number of wake-up frames based on the first number.

20. The system of claim 15, wherein the second node is configurable to:

generate a second number using a random process or a pseudo-random process; and set the second predetermined number of wake-up frames based on the second number.

* * * * *